United States Patent
Kuo et al.

(10) Patent No.: US 10,663,574 B2
(45) Date of Patent: May 26, 2020

(54) ANGLE ESTIMATING METHOD AND RADAR SYSTEM

(71) Applicant: Wistron NeWeb Corporation, Hsinchu (TW)

(72) Inventors: Chi-Cheng Kuo, Hsinchu (TW); Hsin-Lung Hsiao, Hsinchu (TW); Chi-Yung Liao, Hsinchu (TW); Jeng-Da Li, Hsinchu (TW)

(73) Assignee: Wistron NeWeb Corporation, Hsinchu (TW)

(*) Notice: Subject to any disclaimer, the term of this patent is extended or adjusted under 35 U.S.C. 154(b) by 327 days.

(21) Appl. No.: 15/919,182

(22) Filed: Mar. 12, 2018

(65) Prior Publication Data
US 2019/0064339 A1 Feb. 28, 2019

(30) Foreign Application Priority Data
Aug. 30, 2017 (TW) .............................. 106129463 A

(51) Int. Cl.
| | | |
|---|---|---|
| *G01S 13/44* | (2006.01) | |
| *H01Q 25/02* | (2006.01) | |
| *G01S 13/86* | (2006.01) | |
| *G01S 13/42* | (2006.01) | |
| *G01S 13/02* | (2006.01) | |

(52) U.S. Cl.
CPC .......... *G01S 13/4463* (2013.01); *G01S 13/42* (2013.01); *G01S 13/4454* (2013.01); *G01S 13/86* (2013.01); *H01Q 25/02* (2013.01); *G01S 2013/0245* (2013.01)

(58) Field of Classification Search
CPC combination set(s) only.
See application file for complete search history.

(56) References Cited

U.S. PATENT DOCUMENTS

| | | | |
|---|---|---|---|
| 6,452,988 B1* | 9/2002 | Hayward | H01Q 3/2605 342/162 |
| 2009/0121936 A1* | 5/2009 | Maltsev | H01Q 3/2605 342/377 |
| 2014/0159945 A1* | 6/2014 | Chung | G01S 13/44 342/149 |
| 2015/0204966 A1* | 7/2015 | Kishigami | G01S 13/325 342/189 |
| 2015/0247924 A1* | 9/2015 | Kishigami | G01S 13/343 342/70 |
| 2017/0142606 A1* | 5/2017 | Lee | H04B 7/086 |
| 2017/0181010 A1* | 6/2017 | Burgess | H04W 16/28 |
| 2018/0088224 A1* | 3/2018 | Kishigami | H01Q 21/06 |
| 2018/0131540 A1* | 5/2018 | Malik | H04L 27/2628 |

* cited by examiner

*Primary Examiner* — Mamadou L Diallo
(74) *Attorney, Agent, or Firm* — Winston Hsu

(57) ABSTRACT

An angle estimating method applied in a radar system. The radar system includes a first antenna array including M antennas. The angle estimating method includes steps of obtaining a plurality of beamforming weighting vectors; receiving signal from M antennas and forming a received vector; performing an augment operation on the received vector and obtaining an augmented received vector; computing correlation between the augmented received vector and the plurality of beamforming weighting vectors and obtaining a plurality of results accordingly; and determining an angle-of-arrival of an object according to the plurality of results.

14 Claims, 4 Drawing Sheets

ANGLE ESTIMATING METHOD AND RADAR SYSTEM

BACKGROUND OF THE INVENTION

1. Field of the Invention

The present invention relates to an angle estimating method and a radar system, and more particularly, to an angle estimating method and a radar system capable of enhancing angular distinguishing capability.

2. Description of the Prior Art

A radar system with amplitude monopulse usually equips a single transmit antenna and multiple receive antennas. The receiver uses beamforming technology to estimate an angle of arrival (AoA) of an object. Steps of estimating the AoA may comprise generating a phase difference according to time differences corresponding to different angles. Since the phase difference and the AoA of the object form different gains, the antenna patterns may be computed. After the receiver obtains the energy difference of the received signals of the receive antenna, the receiver may use delta-sum ratio ($\Delta/\Sigma$) method to calculate the AoA of the object, where the beamwidth of each beam would affect the angular distinguishing capability regarding the object.

In the amplitude monopulse radar system, one beam is used for detecting one object. Therefore, for two (or more) objects with the same range and the same velocity, the radar system only relies on different beams to distinguish one object from another. It is expected that the narrower the beamwidth, the better the angular distinguishing capability. In the prior art, the beamwidth may be narrowed by increasing the number of transmit/receive antennas. However, increasing number of antennas has a drawback of more antenna space required and more production cost.

Therefore, it is necessary to improve the prior art.

SUMMARY OF THE INVENTION

It is therefore a primary objective of the present invention to provide an angle estimating method and a radar system capable of narrowing beamwidth and enhancing angular distinguishing capability without being equipped with more antennas, to improve over disadvantages of the prior art.

An embodiment of the present invention discloses an angle estimating method, applied in a radar system. The radar system comprises a first antenna array and the first antenna array comprises M antennas. The angle estimating method comprises obtaining a plurality of beamforming weighting vectors corresponding to a plurality of beams, wherein a dimension of the plurality of beamforming weighting vectors is (2M−1), and the plurality of beams correspond to a plurality of specific angle of arrivals (AoAs); receiving M antenna received signals corresponding to the M antennas of the first antenna array, wherein the M antenna received signals are formed as a received vector; performing an augment operation on the received vector to obtain an augmented received vector, wherein a dimension of the augmented received vector is (2M−1); computing correlation between the augmented received vector and the plurality of beamforming weighting vectors, to obtain a plurality of results corresponding to the plurality of beams; and determining an AoA of an object according to the plurality of results.

An embodiment of the present invention further discloses a radar system. The radar system comprises a first antenna array, comprising M antennas, configured to receives M antenna received signals corresponding to the M antennas, wherein the M antenna received signals are formed as a received vector; a processing unit, coupled to the first antenna array, configured to execute the following steps: obtaining a plurality of beamforming weighting vectors corresponding to a plurality of beams, wherein a dimension of the plurality of beamforming weighting vectors is (2M−1), and the plurality of beams correspond to a plurality of specific AoAs; performing an augment operation on the received vector to obtain an augmented received vector, wherein a dimension of the augmented received vector is (2M−1); computing correlation between the augmented received vector and the plurality of beamforming weighting vectors, to obtain a plurality of results corresponding to the plurality of beams; and determining an AoA of an object according to the plurality of results.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
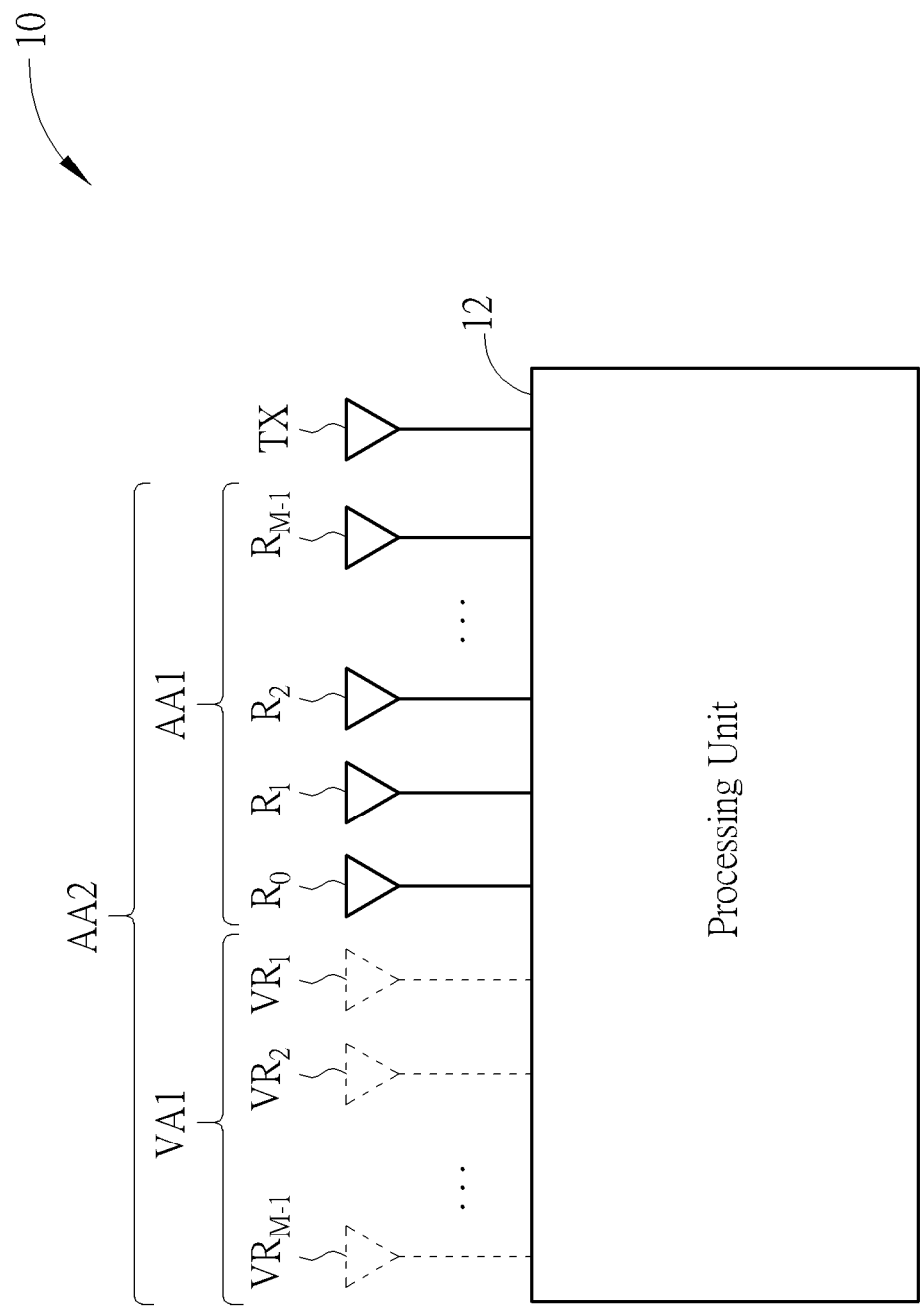
FIG. 1 is a schematic diagram of a radar system according to an embodiment of the present invention.

Please refer to FIG. 1, which is a schematic diagram of a radar system 10 according to an embodiment of the present invention. The radar system 10 is configured to estimate and determine an angle of arrival (AoA) of an object and comprises a transmitting antenna TX, a first antenna array AA1 and a processing unit 12. The transmitting antenna TX is configured to transmit a radar signal. The first antenna array AA1, configured to receive a reflected signal corresponding to the radar signal, comprises antennas $R_0$-$R_{M-1}$. The antennas $R_0$-$R_{M-1}$ are receiving antennas and configured to receive antenna received signals $r_0$-$r_{M-1}$ corresponding to the antennas $R_0$-$R_{M-1}$, respectively. The antennas $R_0$-$R_{M-1}$ are arranged as a uniform linear array (ULA), and the antenna received signals $r_0$-$r_{M-1}$ may be regarded as a received vector r. For example, the received vector r may be expressed as a column vector such as $r=[r_0 \ldots r_{M-1}]^T$. The processing unit 12 may be a digital signal processor (DSP) or other processing unit with computational capability, which is coupled to the first antenna array AA1 and configured to determine an AoA of an object.

Specifically, the processing unit 12 may perform an augment operation on the received vector r, so as to obtain an augmented received vector $r_{(A)}$ having a dimension as (2M−1), and then perform operations related to the receive digital beamforming operation on the augmented received vector $r_{(A)}$, so as to determine the AoA of the object accordingly. The augmented received vector $r_{(A)}$ is equivalent to a received vector received by an antenna array having (2M−1) antennas. In detail, by the augment operation performed on the received vector r by the processing unit 12 and the beamforming weighting vectors for the augmented received vector $r_{(A)}$ formed by the processing unit 12, the processing unit 12 is able to virtualize or simulate virtual antennas $VR_1$-$VR_{M-1}$ and perform the signal processing operations on the received signals corresponding to the virtual antennas $VR_1$-$VR_{M-1}$. Therefore, the virtual antennas $VR_1$-$VR_{M-1}$ may be regarded as a virtual antenna array VA1, and the first antenna array AA1 along with the virtual antenna array VA1 may be regarded as a second antenna array AA2, where the second antenna array AA2 is also an ULA. The augmented received vector $r_{(A)}$ may be regarded as the received signals (or the received vector) received by the second antenna array AA2. Since the augmented received vector $r_{(A)}$ is equivalent to the received signals/vector received by the second antenna array AA2 having (2M−1) antennas, determining the AoA of the object according to the augmented received vector $r_{(A)}$ would enhance the angular distinguishing capability (or angular resolution) of the radar system 10.

Figure 2:
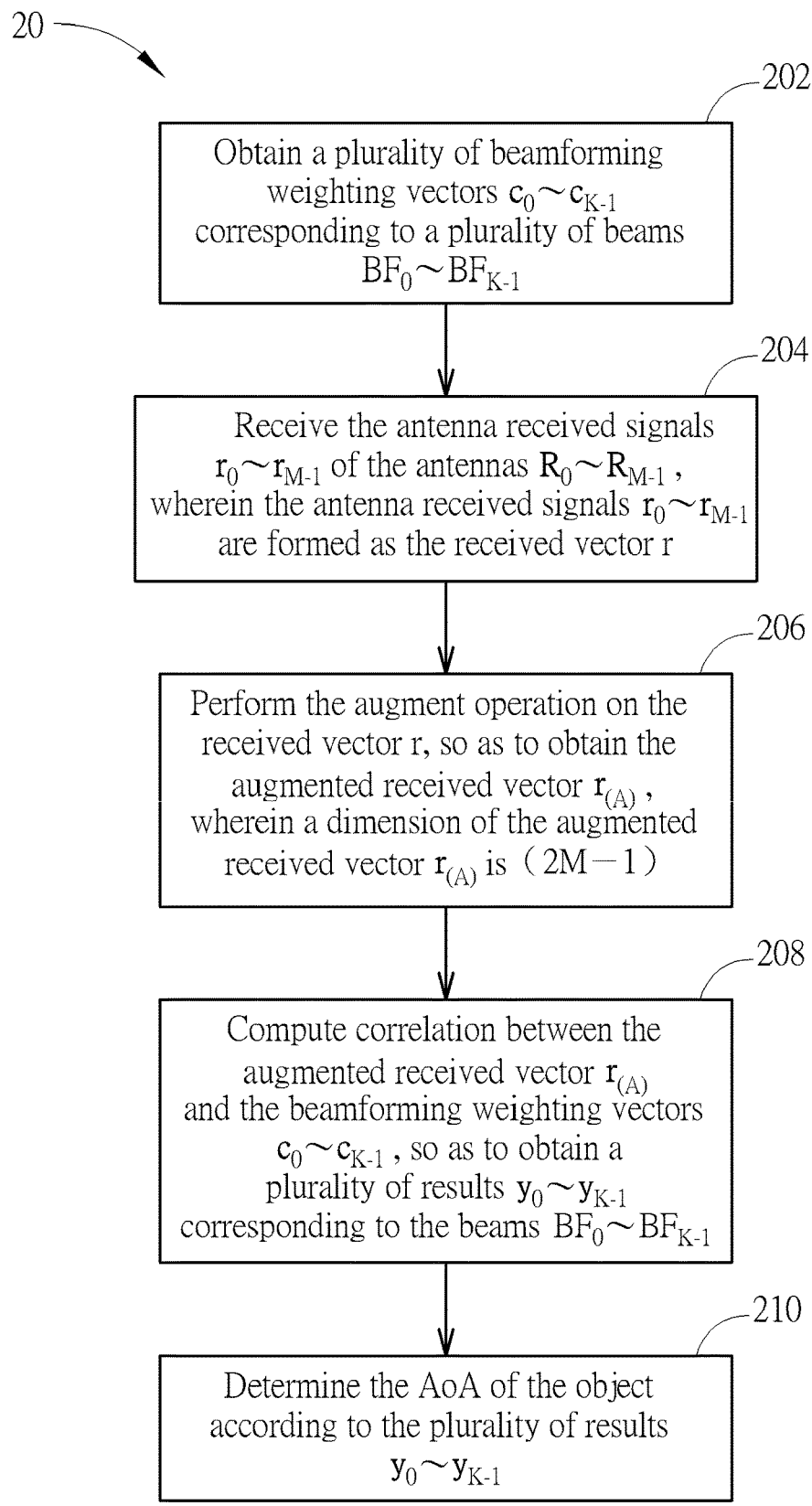
FIG. 2 is a schematic diagram of an angle estimating process according to an embodiment of the present invention.

Please refer to FIG. 2 to see the detailed operation of the radar system 10. FIG. 2 is a schematic diagram of an angle estimating process 20 according to an embodiment of the present invention. The angle estimating process 20 may be executed by the radar system 10, which comprises the following steps:

Step 202: Obtain a plurality of beamforming weighting vectors $c_0$-$c_{K-1}$ corresponding to a plurality of beams $BF_0$-$BF_{K-1}$.

Step 204: Receive the antenna received signals $r_0$-$r_{M-1}$ of the antennas $R_0$-$R_{M-1}$, wherein the antenna received signals $r_0$-$r_{M-1}$ are formed as the received vector r.

Step 206: Perform the augment operation on the received vector r, so as to obtain the augmented received vector $r_{(A)}$, wherein a dimension of the augmented received vector $r_{(A)}$ is (2M−1).

Step 208: Compute correlation between the augmented received vector $r_{(A)}$ and the beamforming weighting vectors $c_0$-$c_{K-1}$, so as to obtain a plurality of results $y_0$-$y_{K-1}$ corresponding to the beams $BF_0$-$BF_{K-1}$.

Step 210: Determine the AoA of the object according to the plurality of results $y_0$-$y_{K-1}$.

In short, the radar system 10 utilizes Step 206 to virtualize the virtual antenna array VA1, and utilizes Step 202 to obtain the plurality of beamforming weighting vectors $c_0$-$c_{K-1}$. The beamforming weighting vectors $c_0$-$c_{K-1}$ are used to perform the signal processing operation in Step 208 (which comprises the receive digital beamforming operation) on the signals of the antennas $R_0$-$R_{M-1}$, as well as the virtual antennas $VR_1$-$VR_{M-1}$. Therefore, along with the physically existing first antenna array AA1 of the radar system 10, the radar system 10 is equivalent to having the second antenna array AA2 with (2M−1) antennas. In other words, the radar system 10 is equivalent to using the second antenna array AA2 having the (2M−1) antennas to determine the AoA of the object, so as to enhance the angular distinguishing capability of the radar system 10.

In detail, in Step 202, the processing unit 12 may firstly obtain the K beamforming weighting vectors $c_0$-$c_{K-1}$ corresponding to K specific AoAs $\theta_0$-$\theta_{K-1}$, K is equal to 2M−1, wherein the beamforming weighting vector $c_i$ represents an array response (or a signature vector) corresponding to the specific AoA $\theta_i$ received by the second antenna array AA2 having the (2M−1) antennas. The beamforming weighting vector $c_i$ may be expressed as equation 1, wherein d represents a distance between two adjacent antennas, and λ represents a signal wavelength.

$$c_i = \left[1, \exp\left(\frac{-j2\pi d\sin\theta_i}{\lambda} \times 1\right), \exp\left(\frac{-j2\pi d\sin\theta_i}{\lambda} \times 2\right), \ldots, \exp\left(\frac{-j2\pi d\sin\theta_i}{\lambda} \times (2M-2)\right)\right]^T \quad \text{(equation 1)}$$

In Step 204, the first antenna array AA1 receives the antenna received signals $r_0$-$r_{M-1}$ of the antennas $R_0$-$R_{M-1}$. The antenna received signals $r_0$-$r_{M-1}$ may be delivered to the processing unit 12, and the processing unit 12 may regard the antenna received signals $r_0$-$r_{M-1}$ as the received vector r.

In Step 206, the processing unit 12 performs the augment operation on the received vector r, to obtain the augmented received vector $r_{(A)}$. In detail, the processing unit 12 may perform a conjugate operation on (M−1) antenna received signals within the received vector r, so as to obtain (M−1) conjugate signals. The processing unit 12 may obtain the augmented received vector $r_{(A)}$ as a vector formed by the (M−1) conjugate signals and the M antenna received signals within the received vector r. For example, the processing unit 12 may perform the conjugate operation on the antenna received signals $r_1$-$r_{M-1}$ within the received vector r, so as to obtain conjugate signals $r_1$-$r_{M-1}$ The processing unit 12 may obtain the augmented received vector $r_{(A)}$ as $[r_{M-1}{}^*, \ldots, r_1{}^*, r_0, r_1, \ldots, r_{M-1}]^T$, wherein $r_i{}^*$ represents a conjugate of $r_i$. In other words, the processing unit 12 utilizes the conjugate signals $r_1{}^*$-$r_{M-1}{}^*$ to simulate or to virtualize the existence of the virtual antennas $VR_0$-$VR_{M-1}$, i.e., the processing unit 12 regards the conjugate signals $r_i{}^*$-$r_{M-1}{}^*$ as the antenna received signals received by the virtual antennas $VR_0$-$VR_{M-1}$. Therefore, the augmented received vector $r_{(A)}$ after the augment operation may be regarded as the received vector (or the received signals) received by the second antenna array AA2 having the (2M−1) antennas. In other words, the processing unit 12 of the radar system 10, which comprises the M physical antennas (i.e., the antennas $R_0$-$R_{M-1}$), may obtain the augmented received vector $r_{(A)}$ with the dimension as (2M−1), after the augment operation, where the augmented received vector $r_{(A)}$ is equivalent to the received vector (or the received signals) received by the second antenna array AA2 having the (2M−1) antennas. In addition, the augment operation performed by the processing unit 12 on the received vector r is similar to a mirroring operation. That is, after the mirroring operation, the augmented received vector $r_{(A)} = [r_{M-1}{}^*, \ldots, r_1{}^*, r_0, r_1, \ldots, r_{M-1}]^T$ is conjugate symmetric with respect to a central value $r_0$ of the augmented received vector $r_{(A)}$.

In Step 208, the processing unit 12 computes the correlation of the augmented received vector $r_{(A)}$ with the beamforming weighting vectors $c_0$-$c_{K-1}$, respectively. Specifically, the processing unit 12 may perform an inner product on the augmented received vector $r_{(A)}$ with the beamforming weighting vectors $c_0$-$c_{K-1}$, respectively, to obtain the results $y_0$-$y_{K-1}$. In an embodiment, the result $y_i$ corresponding to the beamforming weighting vector $c_i$ may be expressed as $y_i = |c_i^H r_{(A)}|$, wherein $c_i^H$ represents a conjugate transpose of $c_i$, $|c_i^H r_{(A)}|$ represents a magnitude or an amplitude of $c_i^H r_{(A)}$. In other words, the result $y_i$ may represent a correlation (or a degree of correlation) of the augmented received vector $r_{(A)}$ with the beamforming weighting vector $c_i$.

In Step 210, the processing unit 12 determines the AoA of the object according to the plurality of results $y_0$-$y_{K-1}$. In detail, the processing unit 12 firstly obtains a result $y_m$ as a maximum of the results $y_0$-$y_{K-1}$, i.e., $y_m$=max($y_0$, . . . , $y_{K-1}$), wherein the result $y_m$ is corresponding to a beam $BF_m$ among the beams $BF_0$-$BF_{K-1}$, and the beam $BF_m$ is corresponding to the specific AoA $\theta_m$. Then, the processing unit 12 determines that the AoA of the object relative to the radar system 10 belongs to an angular range covered by the beam $BF_m$, wherein the result $y_m$ is corresponding to the beam $BF_m$, and the beam $BF_m$ is corresponding to a specific AoA $\theta_m$ among the specific AoAs $\theta_0$-$\theta_{K-1}$. More precisely, in an embodiment, when the processing unit 12 determines that the maximum of the results $y_0$-$y_{K-1}$ is the result $y_m$, the processing unit 12 would determine that the AoA of the object relative to the radar system 10 is within a range between ($\theta_m$-$BW_m$) and ($\theta_m$+$BW_m$), wherein $BW_m$ is related to a beamwidth of the beam $BF_m$.

Since the second antenna array AA2 is regarded as having the (2M-1) antennas, compared to the beams formed by the first antenna array AA1, the beams formed by the second antenna array AA2 have the narrower beamwidths, such that the radar system 10 would have better angular distinguishing capability.

Figure 3:
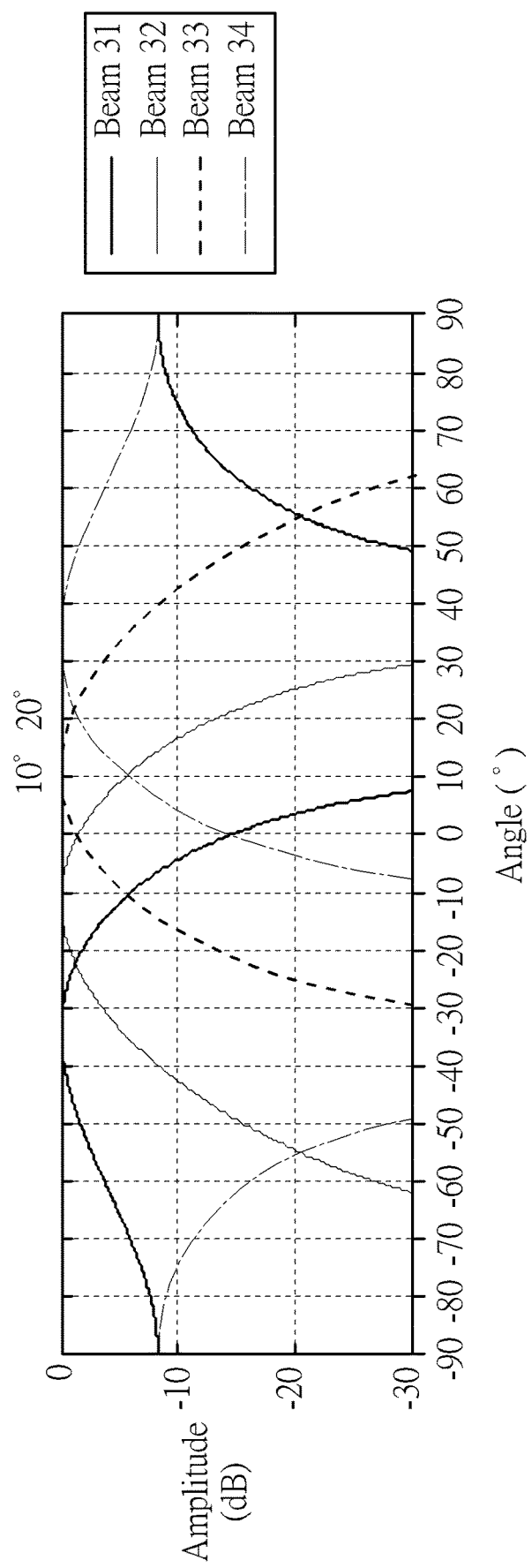
FIG. 3 is a schematic diagram of an antenna pattern of a first antenna array according to an embodiment of the present invention.
Figure 4:
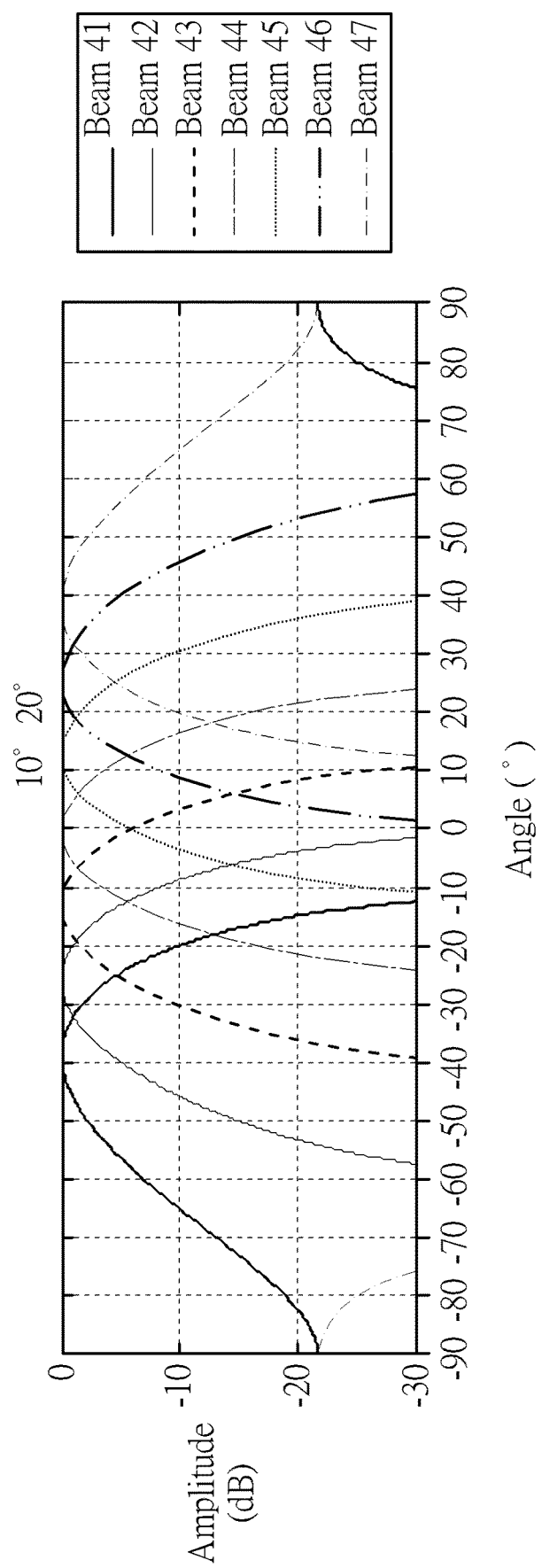
FIG. 4 is a schematic diagram of an antenna pattern of a second antenna array according to an embodiment of the present invention.

Please refer to FIG. 3 and FIG. 4. FIG. 3 is a schematic diagram of antenna patterns of the first antenna array AA1 according to an embodiment of the present invention. FIG. 4 is a schematic diagram of antenna patterns of the second antenna array AA2 according to an embodiment of the present invention. FIG. 3 and FIG. 4 are illustrative examples where M=4. The first antenna array AA1 may forms beams 31-34, and the second antenna array AA2 may forms beams 41-47. As shown in FIG. 3 and FIG. 4, the beams 41-47 have narrower beamwidths compared to the beams 31-34, and the second antenna array AA2 may form more beams, such that the radar system 10 may have better angular distinguishing capability after executing the angle estimating process 20.

In detail, when a first object is located at 10° relative to the radar system 10 and a second object is located at 20° relative to the radar system 10, if the radar system 10 does not execute the angle estimating process 20, the radar system 10 merely can tell that both of a first AoA of the first object and a second AoA of the second object belong to an angular range covered by the beam 33, meaning that the radar system 10 fails to differentiate an angular difference between the first AoA and the second AoA. In comparison, when the first object is located at 10° relative to the radar system 10 and the second object is located at 20° relative to the radar system 10, if the radar system 10 executes the angle estimating process 20, the radar system 10 is able to distinguish that the first AoA of the first object belongs to an angular range covered by the beam 45, and the second AoA of the second object belongs to an angular range covered by the beam 46. In other words, after the radar system 10 executes the angle estimating process 20, the radar system 10 is able to differentiate/distinguish the angular difference between the first AoA and the second AoA, which means that the radar system 10 has better angular distinguishing capability after executing the angle estimating process 20.

Notably, by executing the angle estimating process 20, the radar system 10 may achieve the angular distinguishing capability as having (2M-1) antennas, under a condition that the radar system 10 merely comprise M antennas. Thus, the present invention also has advantages of utilizing the antenna space efficiently.

In summary, the present invention utilizes the augment operation to form the augmented received vector, which is to simulate or virtualize the existence of the virtual antennas and equivalent to narrowing the beamwidths of the formed beams and enhancing the number of the formed beams. Therefore, the angular distinguishing capability of the radar system is enhanced and the antenna space is efficiently used.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An angle estimating method, applied in a radar system, wherein the radar system comprises a first antenna array and the first antenna array comprises M antennas, the angle estimating method comprising:
   obtaining a plurality of beamforming weighting vectors corresponding to a plurality of beams, wherein a dimension of the plurality of beamforming weighting vectors is (2M-1), and the plurality of beams correspond to a plurality of specific angle of arrivals (AoAs);
   receiving M antenna received signals corresponding to the M antennas of the first antenna array, wherein the M antenna received signals are formed as a received vector;
   performing an augment operation on the received vector to obtain an augmented received vector, wherein a dimension of the augmented received vector is (2M-1);
   computing correlation between the augmented received vector and the plurality of beamforming weighting vectors, to obtain a plurality of results corresponding to the plurality of beams; and
   determining an AoA of an object according to the plurality of results.

2. The angle estimating method as claim 1, wherein a beamforming weighting vector within the plurality of beamforming weighting vectors represents an array response corresponding to a specific AoA within the plurality of specific AoAs received by a second antenna array, and the second antenna array is equivalent to an antenna array having (2M-1) antennas.

3. The angle estimating method as claim 1, wherein the step of performing the augment operation on the received vector to obtain the augmented received vector comprises:
   performing a conjugate operation on (M-1) antenna received signals within the M antenna received signals, to obtain (M-1) conjugate signals; and
   obtaining the augmented received vector as a vector formed by the (M-1) conjugate signals and the M antenna received signals.

4. The angle estimating method as claim 1, wherein the M antenna received signals within the received vector are denoted as $r_0, r_1, \ldots, r_{M-1}$, the received vector is related to a vector expressed as $[r_0, r_1, \ldots, r_{M-1}]$, the augmented received vector is related to a vector expressed as $[r_{M-1}^*, \ldots, r_1^*, r_0, r_1, \ldots, r_{M-1}]$, and the M antenna received signals are signals received by the M antennas of the first antenna array.

5. The angle estimating method as claim 1, wherein the step of computing the correlation between the augmented received vector and the plurality of beamforming weighting vectors to obtain the plurality of results comprises:
   performing an inner product operation on the augmented received vector and the plurality of beamforming weighting vectors, to obtain the plurality of results.

6. The angle estimating method as claim 1, wherein the step of computing the correlation between the augmented received vector and the plurality of beamforming weighting vectors to obtain the plurality of results comprises:
    computing a result corresponding to a beamforming weighting vector to be related to $c_i^H r_{(A)}$;
    wherein $r_{(A)}$ represents the augmented received vector, $c_i$ represents the beamforming weighting vector, and $c_i^H$ represents a conjugate transpose of $c_i$.

7. The angle estimating method as claim 1, wherein the step of determining the AoA of the object according to the plurality of results comprises:
    obtaining a first result as a maximum of the plurality of results, wherein the first result is corresponding to a first beam; and
    determining the AoA of the object to be related to a first specific AoA corresponding to the first result, wherein a difference between the AoA and the first specific AoA is smaller than a range, the range is related to a first beamwidth of the first beam.

8. A radar system, comprising:
    a first antenna array, comprising M antennas, configured to receives M antenna received signals corresponding to the M antennas, wherein the M antenna received signals are formed as a received vector;
    a processing unit, coupled to the first antenna array, configured to execute the following steps:
        obtaining a plurality of beamforming weighting vectors corresponding to a plurality of beams, wherein a dimension of the plurality of beamforming weighting vectors is (2M−1), and the plurality of beams correspond to a plurality of specific angle of arrivals (AoAs);
        performing an augment operation on the received vector to obtain an augmented received vector, wherein a dimension of the augmented received vector is (2M−1);
        computing correlation between the augmented received vector and the plurality of beamforming weighting vectors, to obtain a plurality of results corresponding to the plurality of beams; and
        determining an AoA of an object according to the plurality of results.

9. The radar system as claim 8, wherein a beamforming weighting vector within the plurality of beamforming weighting vectors represents an array response corresponding to a specific AoA within the plurality of specific AoAs received by a second antenna array, and the second antenna array is equivalent to an antenna array having (2M−1) antennas.

10. The radar system as claim 8, wherein the processing unit is further configured to execute the following steps, to perform the augment operation on the received vector to obtain the augmented received vector:
    performing a conjugate operation on (M−1) antenna received signals within the M antenna received signals, to obtain (M−1) conjugate signals; and
    obtaining the augmented received vector as a vector formed by the (M−1) conjugate signals and the M antenna received signals.

11. The radar system as claim 8, wherein the M antenna received signals within the received vector are denoted as $r_0$, $r_1$, ..., $r_{M-1}$, the received vector is related to a vector expressed as $[r_0, r_1, ..., r_{M-1}]$, the augmented received vector is related to a vector expressed as $[r_{M-1}^*, r_1^*, r_0, r_1, ..., r_{M-1}]$, and the M antenna received signals are signals received by the M antennas of the first antenna array.

12. The radar system as claim 8, wherein the processing unit is further configured to execute the following steps, to compute the correlation between the augmented received vector and the plurality of beamforming weighting vectors to obtain the plurality of results:
    performing an inner product operation on the augmented received vector and the plurality of beamforming weighting vectors, to obtain the plurality of results.

13. The radar system as claim 8, wherein the processing unit is further configured to execute the following steps, to compute the correlation between the augmented received vector and the plurality of beamforming weighting vectors to obtain the plurality of results:
    computing a result corresponding to a beamforming weighting vector to be related to $c_i^H r_{(A)}$;
    wherein $r_{(A)}$ represents the augmented received vector, $c_i$ represents the beamforming weighting vector, and $c_i^H$ represents a conjugate transpose of $c_i$.

14. The radar system as claim 8, wherein the processing unit is further configured to execute the following steps, to determine the AoA of the object according to the plurality of results:
    obtaining a first result as a maximum of the plurality of results, wherein the first result is corresponding to a first beam; and
    determining the AoA of the object to be related to a first specific AoA corresponding to the first result, wherein a difference between the AoA and the first specific AoA is smaller than a range, the range is related to a first beamwidth of the first beam.

* * * * *